United States Patent [19]
Everest et al.

[11] 3,723,002
[45] Mar. 27, 1973

[54] RANGEFINDERS

[75] Inventors: Frank G. Everest, Stevenage; Raymond L. Albery, Biggleswade, both of England

[73] Assignee: British Aircraft Corporation, Limited, London, England

[22] Filed: Dec. 7, 1971

[21] Appl. No.: 205,596

[30] Foreign Application Priority Data

Dec. 10, 1970 Great Britain.....................58,747/70

[52] U.S. Cl. ............................356/5, 356/4, 343/7.3
[51] Int. Cl. ...............................................G01c 3/08
[58] Field of Search .......................356/4, 5; 343/7.3

[56] References Cited

UNITED STATES PATENTS 3,648,286   3/1972   Schoneborn ........................343/7.3

3,630,616   12/1971   Everest................................343/7.3

Primary Examiner—Benjamin A. Borchelt
Assistant Examiner—S. C. Buczinski
Attorney—Richard C. Sughrue et al.

[57] ABSTRACT

In a laser rangefinder a gating pulse is generated after each laser pulse emission and the time-positions of successive gating pulses in the intervals between laser pulses are progressively shifted and correspond to progressively changing ranges for reflected light pulses. When a signal corresponding to a reflected light pulse falls within the gating pulse period, the gated output is integrated and when the integrated value exceeds a threshold value the progressive alteration of the time positions of the gating pulses is halted.

6 Claims, 1 Drawing Figure

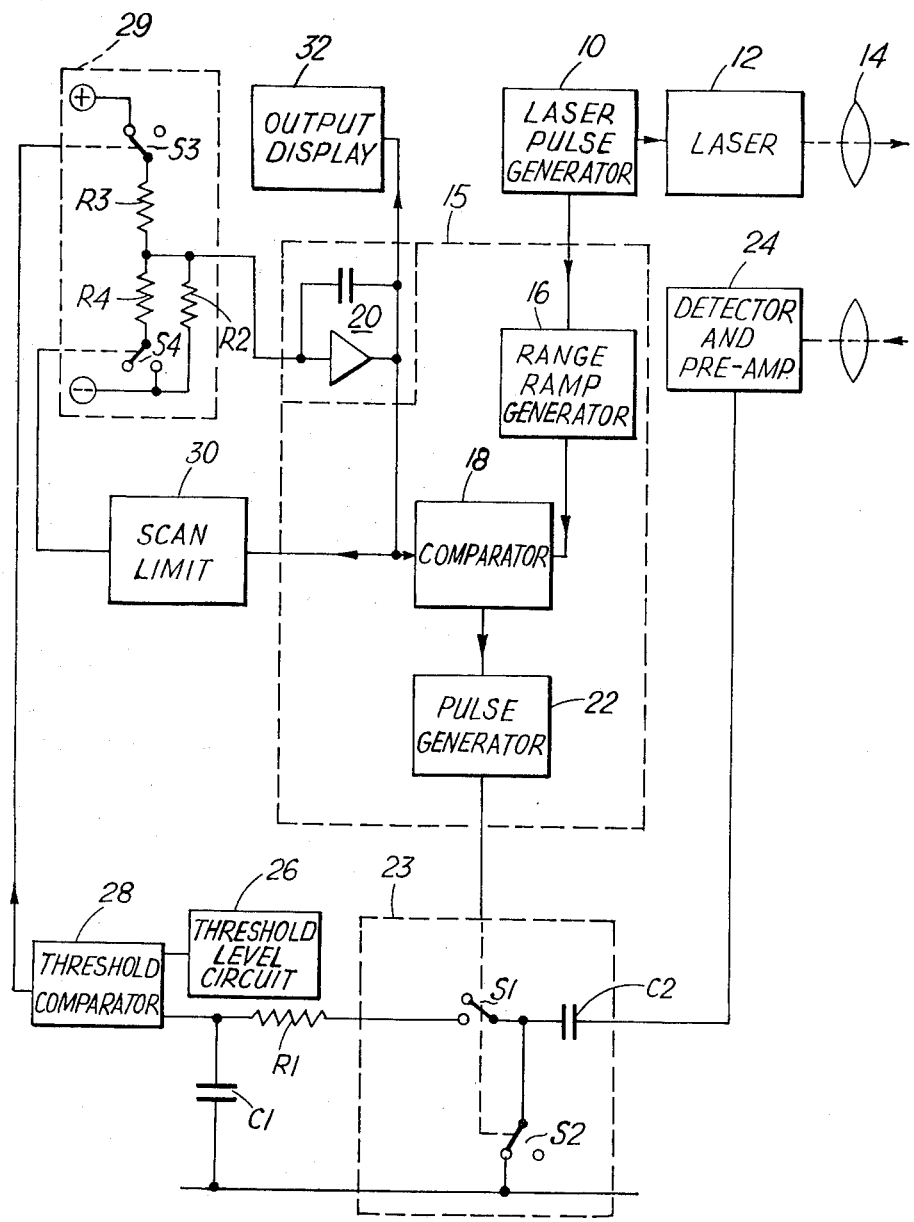

RANGEFINDERS

This invention is concerned with rangefinders of the kind in which a laser emits a succession of light pulses and a detector detects the receipt of reflected laser light and generates a corresponding electric signal. The interval between a transmitted laser pulse and the received reflection represents the range of the reflecting object. In systems using pulsed lasers capable of high pulse repeat frequency (such as gallium arsenide lasers, for example) there is a limit to both the peak output power and to the mean output power of the laser. The low power of a reflected pulse derived from such a system and the low signal/noise ratio makes detection difficult.

However, there is no limit to the pulse repeat frequency that can be used with such a laser, provided that the mean power limit of the laser is not exceeded and the present invention relies on pulse integration to improve the signal/noise ratio in a system employing a laser of high pulse repeat frequency.

A rangefinding system according to the present invention includes scanning pulse-generating means for generating a series of electric pulses, one in each interval between laser pulses, the scanning pulse-generating means including timing means for progressively altering the time-position of the generated pulse within the interval between successive laser pulses so that the moments of occurrence of the generated pulses in the intervals correspond to progressively changing ranges for reflected light pulses, gating means responsive to the generated pulses to pass a signal representative of a reflected laser pulse only when a generated pulse is present, means integrating the output of the gating means, and means connected with the timing means and with the integrating means and responsive when the integrated value exceeds a threshold value to stop the progressive alteration of the time position of the generated pulse in the sense in which the said alteration was progressing.

In the preferred form of rangefinder embodying the present invention a D.C. restoring circuit is connected between the output of the detector and the gating means. The effect of such a circuit, if the time-width of the gate is suitably chosen in relation to the duration of the reflected pulse, is to ensure that as the gating pulse moves across the signal representing the reflection, the output of the gate is first of one polarity and then of the other. Consequently, the gate output applies a positive polarity to the threshold detector over only a narrow range of gate positions in relation to the reflection signal and enhanced positional accuracy is thereby obtained.

The means for progressively altering the time-position of the generated pulses may consist of a first ramp generator which generates a ramp waveform following each laser pulse and a second and slower ramp generator generating a ramp waveform which extends over a number of cycles of the first ramp generator waveform, together with a comparator circuit which generates a pulse each time that the levels of the two ramps are the same.

In order that the invention may be better understood, one example of apparatus embodying the invention will now be described with reference to the accompanying drawing.

In the drawing, a laser pulse generator 10 drives a laser 12 at a high pulse repetition frequency and the resulting short laser pulses are directed at a target through a lens 14. As each laser pulse is transmitted a synchronized pulse from the generator 10 triggers a range ramp generator 16 in a scanning pulse generator 15. Thus, for each transmitted laser pulse the generator 16 provides a ramp waveform having a rate of 1 volt/microsecond, for example. This ramp waveform is applied to one side of a comparator 18.

A slow scan generator 20 provides a ramp waveform extending over a number of cycles of the ramp generator 16 and this slow ramp waveform is applied to the other side of the comparator 18. Each time that the instantaneous level of the fast ramp waveform from generator 16 equals the instantaneous value of the slow ramp waveform from the generator 20, the comparator 18 generates an output pulse which triggers a pulse generator 22. It will be seen that the pulses from the comparator occur at progressively changing time-positions in the interval between successive laser pulses and thus correspond to a progressively changing range. The generator 20 can thus be considered as a range scanner which, in this example, moves slowly downwards from a maximum output to a minimum output, corresponding to scanning from maximum range to minimum range.

The pulse from generator 22 is applied to a gating and D.C. restoring circuit 23 which includes a signal gating switch S1 and a signal starting switch S2. It will be appreciated that although these switches are represented diagrammatically as simple contact switches in the drawing, in practice electronic switching circuits of conventional design are used. In the condition shown in the diagram, switch S2 conducts the output of capacitor C2 to earth and switch S1 is in its non-conducting condition. When a pulse is received from generator 22 switch S1 becomes conductive and simultaneously switch S2 removes the earthing circuit from the output of capacitor C2. Thus, switch S2 has the effect of inserting a D.C. component at the output of capacitor C2 in the intervals between gating pulses. A detector and preamplifier circuit 24 receives light reflected from any reflecting object in the path of the laser beam and applies a corresponding electric signal to capacitor C2. If while the switch S1 is in its signal-passing condition there is a reflection signal at the output of capacitor C2 (that is to say if the light-reflecting object is at the range represented at that instant by the output level of the slow scan generator) this signal is passed through the switch S1 to an integrator consisting of a capacitor C1 and a resistor R1. Between gating pulses from the generator 22, the switches S1 and S2 revert to their original conditions and the signal on capacitor C1 is stored. The time constant of the circuit R1-C1 is chosen to obtain the performance required from the apparatus. Typically, it would represent a period of several hundred gating pulses. There might be several thousand pulses in an uninterrupted scan from maximum to minimum range.

The gating pulse width is set to be more than half the expected length of the received pulse but less than the total length of the received pulse. The value of the gating pulse width is, however, not critical. The slow scan rate is such that the reflected pulse from an object illuminated by the laser beam is likely to be coincident with the pulses from the generator 22 during a number of successive pulses. Thus, the signals from the preamplifier 24 corresponding to successive reflections will be integrated by the capacitor C1.

The first coincidence between the reflection-representing signal from preamplifier 24 and the range-scan pulse from generator 22 will usually be very brief and successive coincidences will progressively increase in duration as the range scan pulse "moves across" the target reflection pulse. The charge on capacitor C1 will rise until a threshold voltage, set by a threshold level circuit 26, is reached. A threshold comparator 28 detects this condition and applies a signal to a scanning control circuit 29. The scanning control circuit contains two switches S3 and S4; these are again illustrated as simple contact switches but in practice are electronic switching circuits. The signal from the threshold comparator 28 opens the switch S3 which is in series with a resistor R3 between the input of the slow scan generator 20 and a positive terminal. The opening of the switch S3 stops the "downward" scan of the slow scan generator 20. A further resistor R2 connected between the input of the slow scan generator 20 and a negative terminal ensures that when the switch S3 is open the output of the slow scan generator 20 rises slowly, causing the gating pulses to occur at progressively later time-positions in the intervals between laser pulses until the input to the threshold comparator falls below the threshold setting. At this point, the comparator 28 ceases to hold the switch S3 open and the slow scan generator input is again connected to the positive terminal, thereby bringing the gating pulse back on to the received reflection pulse.

Thus, the system hunts on to the return pulse, alternately scanning into it and then slowly moving off again to longer range. The width of this hunting "movement" is approximately equal to half the return pulse width. This determines the maximum accuracy which the system can achieve.

The scan limit 30 is used to control the scan generation in the absence of a return signal. When the value of the output of the slow scan generator corresponds to the minimum range value, the switch S4 connects the slow scan generator input through a resistor R4 to the negative terminal. The value of resistor R4 is such that the slow scan generator output returns rapidly to a value corresponding to the maximum range, at which level the scan limit circuit 30 again opens switch S4 to permit a new scanning cycle to commence. The output of the slow scan generator is also applied to an output display 32.

We claim:

1. A rangefinder comprising a laser arranged to emit a succession of light pulses, a detector for detecting the receipt of reflected laser light and generating a corresponding electric signal, scanning pulse-generating means for generating a series of electric pulses, one in each interval between laser pulses, the scanning pulse-generating means including timing means for progressively altering the time-position of the generated pulse within the interval between successive laser pulses so that the moments of occurrence of the generated pulses in the intervals correspond to progressively changing ranges for reflected light pulses, gating means responsive to the generated pulses to pass a signal representative of a reflected laser pulse only when a generated pulse is present, means integrating the output of the gating means, and means connected with the timing means and with the integrating means and responsive when the integrated value exceeds a threshold value to stop the progressive alteration of the time position of the generated pulse in the sense in which the said alteration was progressing.

2. A rangefinder in accordance with claim 1, including a D.C. restoring circuit connected between the output of the detector and the gating means.

3. A rangefinder in accordance with claim 2, in which the D.C. restoring circuit includes switching means whereby the said circuit is rendered inoperative during the said generated pulses.

4. A rangefinder in accordance with claim 1, in which the scanning pulse-generating means includes second timing means for progressively altering the time-position of the generated pulse within the interval between successive laser pulses, the second timing means altering the time-position in a sense opposite to the alteration provided by the first timing means, and switching means for rendering the said second timing means operative when the integrated value exceeds the threshold value.

5. A rangefinder in accordance with claim 1, in which the scanning pulse-generating means includes a first ramp generator generating a ramp waveform following each laser pulse and a second and slower ramp generator generating a ramp waveform which extends over a number of cycles of the first ramp generator waveform, and a comparator circuit connected to receive ramp signals from the two ramp generators and generating a pulse each time that the instantaneous levels of the two ramp waveforms are the same.

6. A rangefinder in accordance with claim 1, in which the laser is a gallium arsenide laser.

* * * * *